United States Patent
Lehew et al.

(10) Patent No.: US 7,546,373 B2
(45) Date of Patent: Jun. 9, 2009

(54) SECURE DYNAMIC CREDENTIAL DISTRIBUTION OVER A NETWORK

(75) Inventors: Christian R. Lehew, Redmond, WA (US); Harry S. Pyle, Bellevue, WA (US); Nicholas Jie Fang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 594 days.

(21) Appl. No.: 10/888,190

(22) Filed: Jul. 9, 2004

(65) Prior Publication Data

US 2005/0108546 A1   May 19, 2005

Related U.S. Application Data

(60) Provisional application No. 60/520,209, filed on Nov. 14, 2003.

(51) Int. Cl.
*G06F 15/16* (2006.01)
*G06F 7/04* (2006.01)
*H04K 1/00* (2006.01)
*H04L 9/00* (2006.01)
*H04L 29/06* (2006.01)

(52) U.S. Cl. ............... 709/229; 726/2; 726/8; 713/182

(58) Field of Classification Search ............ 713/182, 713/184; 726/5, 8, 2; 709/229
See application file for complete search history.

(56) References Cited

U.S. PATENT DOCUMENTS

| 6,240,512 | B1 * | 5/2001 | Fang et al. ............ 713/150 |
| 7,020,645 | B2 * | 3/2006 | Bisbee et al. .......... 709/229 |
| 7,085,840 | B2 * | 8/2006 | de Jong et al. ........ 709/229 |
| 2002/0186249 | A1 | 12/2002 | Lu et al. ............... 345/781 |

FOREIGN PATENT DOCUMENTS

| WO | WO 99/34551 | 7/1999 |
| WO | WO 2007062672 A1 * | 6/2007 |

OTHER PUBLICATIONS

Reiner Kraft, "Designing a distributed access control processor for network services on the Web", Nov. 2002, XMLSEX '02: Proceedings of the 2002 ACM workshop on XML security, pp. 36-52.*

Chang, C.C. et al., "Using Smart Cards to Authenticate Remote Passwords," *Computers & Math. Applic.*, 1993, 26(7), 19-27.

Kornievskaia, O. et al., "Kerberized Credential Translation: A Solution to Web Access Control," *Proceedings of the 10th USENIX Security Symposium*, Washington, DC, Aug. 13-17, 2001, 235-249.

(Continued)

*Primary Examiner*—Matthew B Smithers
*Assistant Examiner*—Courtney D Fields
(74) *Attorney, Agent, or Firm*—Woodcock Washburn LLP

(57) ABSTRACT

Systems and methods for enabling secure dynamic credential distribution to a machine over a network are provided. In various embodiments, a computer, into which logging or access is sought, distributes logon credentials automatically to a requestor over the network before logon. Based on pre-existing trust, the computer self-generates and self-distributes logon credentials to the requestor, whereby the logon credentials are not stored on the requestor device.

35 Claims, 7 Drawing Sheets

OTHER PUBLICATIONS

Sandirigama, M. et al., "Simple and Secure Password Authentication Protocol (SAS)," *IEICE Trans. Commun.*, 2000, E83B(6), 1363-1365.

Wang, B. et al., "Cryptanalysis of an Enhanced Timestamp-Based Password Authentication Scheme," *Computers & Security*, 2003, 22(7), 643-645.

Wu, T.C. et al., "Authenticating Passwords Over an Insecure Channel," *Computers & Security*, 1996, 15(5), 431-439.

Yeh, H.T. et al., "Security of a Remote User Authentication Scheme Using Smart Cards," *IEICE Trans. Commun.*, 2004, E87B(1), 192-194.

Yeh, T.C. et al., "A Secure One-Time Password Authentication Scheme Using Smart Cards," *IEICE Trans. Commun.*, 2002, E85B(11), 2515-2518.

* cited by examiner

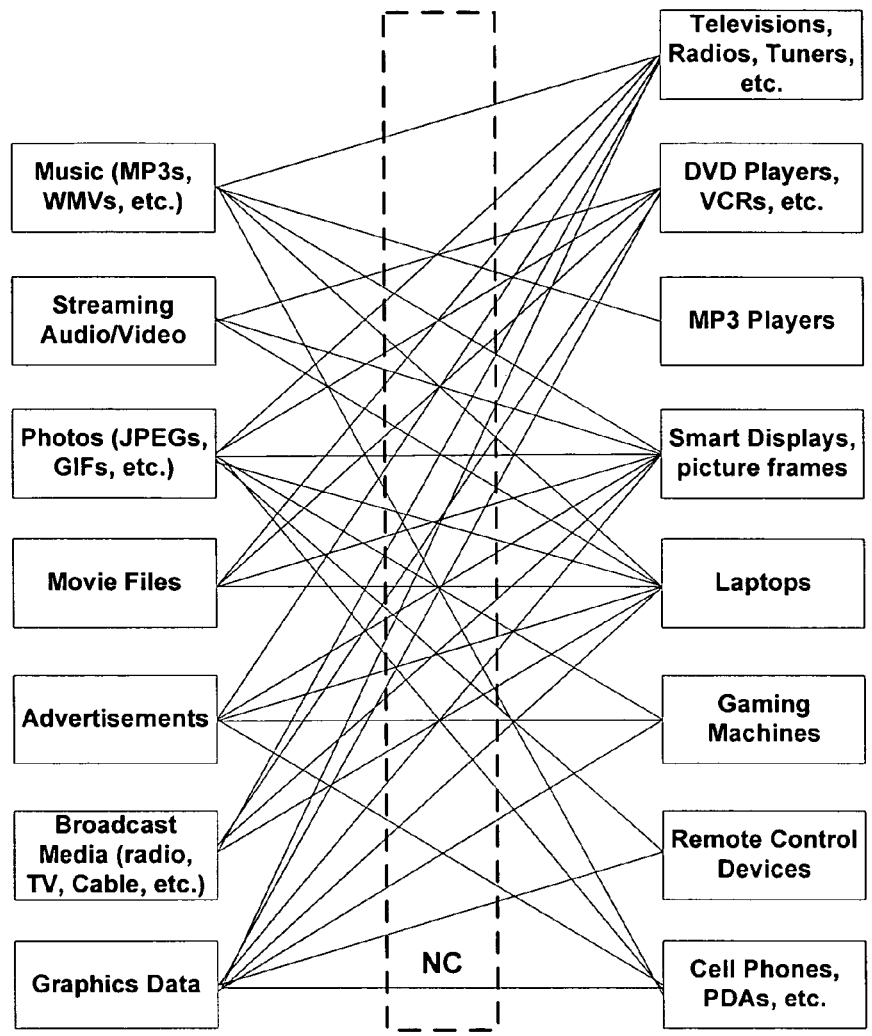
FIG. 1A
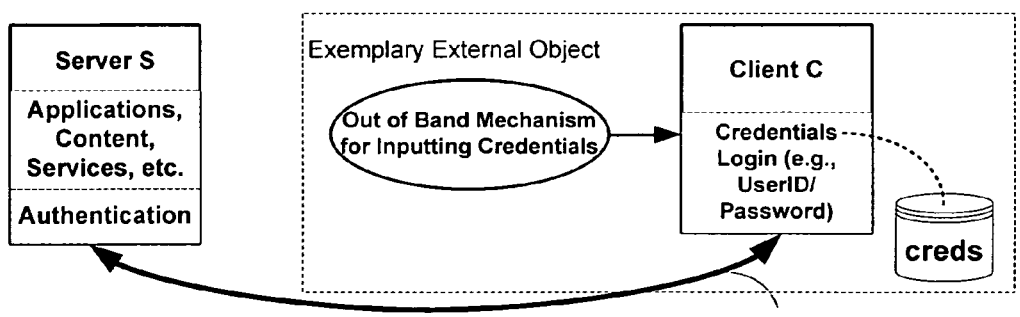
FIG. 1B - Prior Art

SECURE DYNAMIC CREDENTIAL DISTRIBUTION OVER A NETWORK

CROSS REFERENCE TO RELATED APPLICATION

This patent application claims benefit of U.S. Provisional Application No. 60/520,209, filed Nov. 14, 2003, entitled "Secure Dynamic Credential Distribution Over a Network."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2003, Microsoft Corp.

FIELD OF THE INVENTION

This invention relates to the secure and dynamic distribution of credential(s) from a first computing device to a second computing device over a network in a computing system. More particularly, the invention relates to ways of dynamically and securely distributing login credentials from a first device to a second device, e.g., for automatic login by the second device, without exposing or storing the credentials at the second device.

BACKGROUND

There are many reasons why it may be desirable for a first computing device to receive credential(s), such as a user identification and password, from a second computing device (or vice versa), in order to identify the second device and/or determine access levels and permissions for the second device.

For instance, a host computer may have content to which a client device may wish to request access: This is a fairly common scenario and as illustrated in FIG. 1A, the world of computing devices and types of content that may be requested from various other computing devices is quite diverse, both in terms of media devices and media types. For exemplary purposes only, FIG. 1A illustrates that there are many kinds of media, such as music (MP3s, WMVs, etc.), streaming audio/video, photos (JPEGS, GIFs, etc.), movie files (MOVs, MPEG, etc.), advertisements, broadcast media (Radio, TV, Cable, etc.), graphics data, etc. FIG. 1A also illustrates that there are a variety of devices that render media in some fashion, for some purpose including, but not limited to, televisions, radios, tuners, DVD players, VCRs, digital data storage and/or rendering devices, MP3 players, Smart Display devices, laptops, gaming machines, remote control devices, cell phones, PDAs, digital picture frames, etc. Establishing trust among any two devices in such a system is thus an important problem—to enable secure sharing, among a variety of computing devices, of content or resources of the content hosting device in what becomes a networked trust enclave of devices.

Thus, in order to give access to resource(s) of the first computing device to the second computing device, it is frequently desirable to have the first computing device "trust" something about the second computing device, e.g., for security and/or privacy reasons. One common way to give access is to receive credentials from the requesting device, which when received by the hosting device, act as keys to the lock in the door, thereby establishing trust. It can be appreciated that such credential(s) may be exchanged between two computing devices in any computing environment, e.g., network architectures that include peer-to-peer clients, distributed computing systems, thin-client architectures where application processing occurs mainly on a central server, but can be distributed as well, and as described in more detail below, other networked environments as well.

FIG. 1B illustrates a typical prior art logon between a first computing device (e.g., server S) and a second computing device (e.g., client C) in an exemplary networked environment wherein server S and client C communicate over any network connection NC, whether wired or wireless. An authentication exchange may occur between the two devices for a variety of reasons. In a prototypical scenario, client C wishes to access some resource(s) of the server S, such as applications, content, services, etc., or start a session with the server S. Before allowing access to its applications, content, services, etc., however, server S will require some proof that client C is allowed to access the applications, services, content, etc. of the server S. This may include receiving credentials, such as a user identification and password, from the client C.

Today, for such a scenario, if an external object to a computer S attempts to log into the computer S over network NC, the external object presents credentials for authentication using a standard mechanism known to the client C and server S. A credentials login component delivers the credentials to the server S from client C, and an authentication component on server S allows access to its resources according to the permissions represented by the client C's credentials. Generally, it is a physical user that wants to login, and the credentials are usually remembered by the user herself. The user manually inputs the credentials to the computing device C via an external mechanism, e.g., by entering the credentials at login via an input device such as a keyboard. In other prior art systems, the user may type in the credentials one time and, from that time forth, the credentials may be cached or otherwise stored on client C (e.g., "creds" in FIG. 1B). Regardless, the initial transfer of the credentials to client C happens "out-of-band" of the network NC.

However, if the external object is a machine (i.e., not a physical user) that wishes to login in an automated way, the machine must currently obtain credentials from somewhere and this too is usually transferred "out-of-band" of the network via an out of band mechanism for inputting credentials to client C. As mentioned, the main reason for this is to establish trust between the devices. If client C knows a secret from some external out-of-band source that server S and only server S recognizes, then client C can be assumed to be a trusted user of the network NC for communications exchanges between the devices.

However, where trust is already established between two devices, there are at least two reasons for questioning the security of the above-identified prior art login system: (1) vulnerability to dictionary attack and (2) threat of discovery of credentials stored on the client machine.

With respect to the threat of a dictionary attack, a malicious external object could repeatedly with brute force try every input combination and permutation possible for entering credentials and eventually, over time and due to the law of strong numbers, randomly guess the credentials. To fend off a dictionary attack, credentials can be rotated, i.e., changed, frequently. If the credentials are rotated too frequently, however, the user will have difficulty remembering the credentials. And on the other hand, if the credentials are not rotated frequently enough, the threat of the dictionary attack is not mitigated.

A second concern is that the credentials tend to be stored, or cached for some period of time, on client C in such systems, exposing resources of server S to danger. Should a malicious hacker determine how to expose their existence on client C, the resources of server S become exposed. The problem compounds if the hacker shares the credentials with other users and devices. This risk remains whether the credentials are rotated or not, and whether it is a physical user or machine that is responsible for inputting the credentials for login. From the standpoint of server S, this is a problem because the security risks to its resources are no longer localized to the four corners of its storage.

Where trust is already established between the devices, however, there should be a way to hand out credentials to the client dynamically just before login for automatic login in a way that enables frequent rotation of the credentials and does not store the credentials on the client machine.

Thus, it would be desirable to have a way for logon credentials to be handed out over the network automatically, by the computer into which logging or access is sought, just before the login actually occurs. It would be desirable to have a way for an authentication exchange to ensue between two computing devices based on those credentials in a way that is not subject to the threat of a dictionary attack, or subject to local snooping of the client C's storage to extract credentials. It is further desirable to have a generic and simple mechanism or framework for a first device to securely declare or distribute a credential to a second device, over the same network over which the subsequent login exchange occurs.

SUMMARY OF THE INVENTION

In consideration of the above-identified shortcomings of the art, the present invention provides systems and methods for providing secure dynamic credential distribution over a network. In various embodiments, the invention provides systems and methods for distributing logon credentials to a requester over the network automatically, by the computer into which logging or access is sought before the login occurs. In exemplary embodiments, based on pre-existing trust, the computer self-generates and self-distributes logon credentials to the requestor, whereby the logon credentials are not stored by the requestor.

Other advantages and features of the invention are described below.

BRIEF DESCRIPTION OF THE DRAWINGS

The systems and methods for providing secure dynamic credential distribution in accordance with the present invention are further described with reference to the accompanying drawings in which:

FIG. 1A illustrates how diverse media types and media devices are when it comes to providing a media experience;

FIG. 1B illustrates an exemplary prior art computing environment in which one computing device logs into another for access to its resources;

DETAILED DESCRIPTION OF THE INVENTION

Overview

Figure 2A:
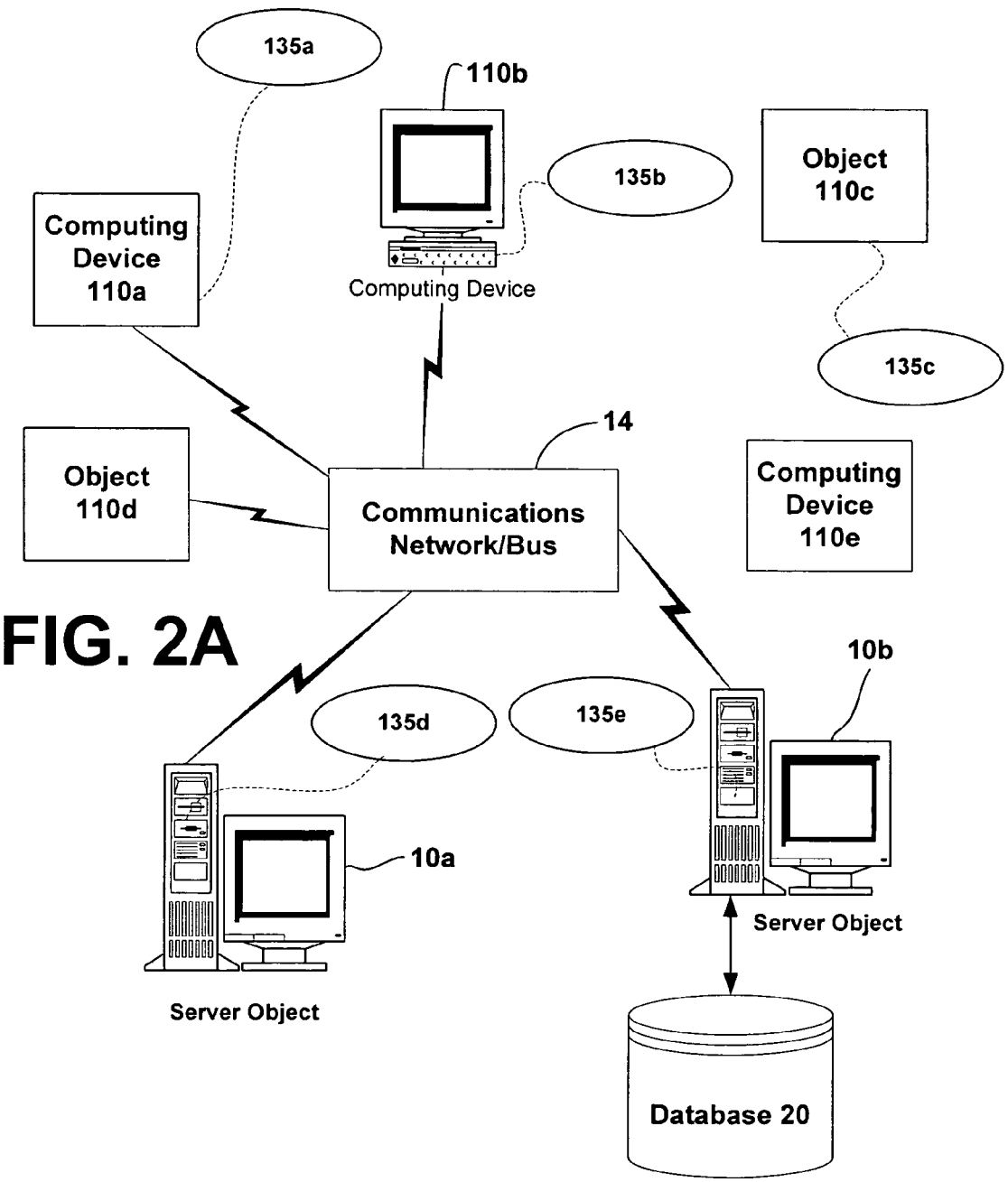
FIG. 2A is a block diagram representing an exemplary network environment having a variety of computing devices in which the present invention may be implemented.

The request for digital content by a second computing device is an example of a time when the second computing device may wish to automatically receive a securely distributed credential that is dynamically generated from the first computing device. Such requests for digital content will continue to proliferate with the advent of web services and mobile web services. Already, a broad ecosystem of networked devices has been introduced to the world that deliver entertainment experiences (such as TV, music, videos, photographs, DVD's, etc) throughout the home on a variety of devices (such as electronic home remote media devices, Smart Displays, xBoxes, pocket PCs, portable DVD devices, and the like). Before such content can be delivered to a requesting computing device, however, a credential exchange occurs between the requesting device and the device with the content, inter alia, to validate the requesting device. As discussed above, there are certain risks associated with prior art login techniques. The present invention recognizes that these risks can be avoided where trust is already established between the devices. Accordingly, the invention provides a generic framework for automatically distributing credential(s) to a requesting device over the network in a simple manner just before login by the requesting device occurs over the network.

Exemplary Networked Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with secure dynamic distribution of credentials in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. With network sources for digital media proliferating more than ever, the invention is particularly relevant to those computing devices operating in a network or distributed computing environment, and thus the techniques for securely and dynamically distributing credentials in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power and storage to benefit the entire enterprise. In this regard, a variety of devices may have applications, objects or resources that may implicate dynamic request for and delivery of credentials just before login, as may be achieved in accordance with the invention.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, TVs, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each of the objects 10a, 10b, etc. or 110a, 110b, 110c, etc. may contain an application that might make use of an interface, such as an API, or other object, software, firmware and/or hardware, to request or make use of the processes in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects, or any device that may be utilized in connection with a media experience.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the secure dynamic distribution of credential(s) according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which request or make use of the processes for securely and dynamically distributing credentials in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. For instance, computer 110a may be a Media Center Edition (MCE) host PC, and computing devices 10a, 10b, etc. may be remote media consumption devices. Any of these computing devices may be processing data or requesting services or tasks that may implicate techniques for securely and dynamically distributing credentials in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." For instance, Remote Desktop Protocol (RDP) is a common protocol utilized for remote computing. Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device with unique media abilities when it comes to storage, user interface, rendering, etc.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 10b, etc. and other like devices, and databases 20.

Exemplary Computing Device

Figure 2B:
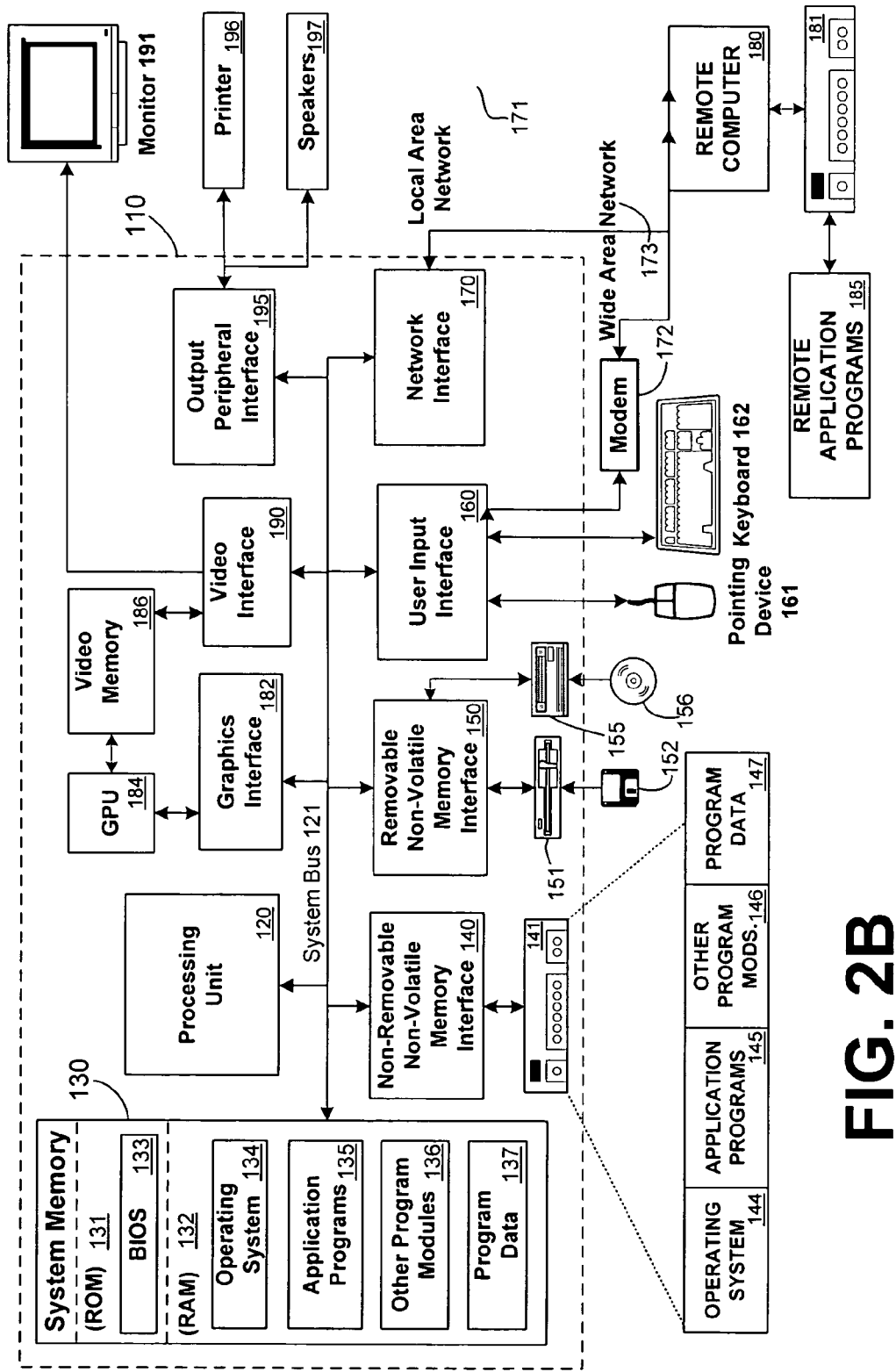
FIG. 2B is a block diagram representing an exemplary non-limiting server computing device in which the present invention may be implemented.

FIG. 2B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where resources may be requested or where media may be experienced in a computing environment. While a general purpose computer is described below as an exemplary host, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the secure dynamic distribution of credentials in accordance with the invention.

Although not required, the invention can be implemented via an operating system, for use by a developer of services for a device or object, and/or included within application software that operates in connection with the delivery or receipt of a credential in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, another exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Device

Figure 2C:
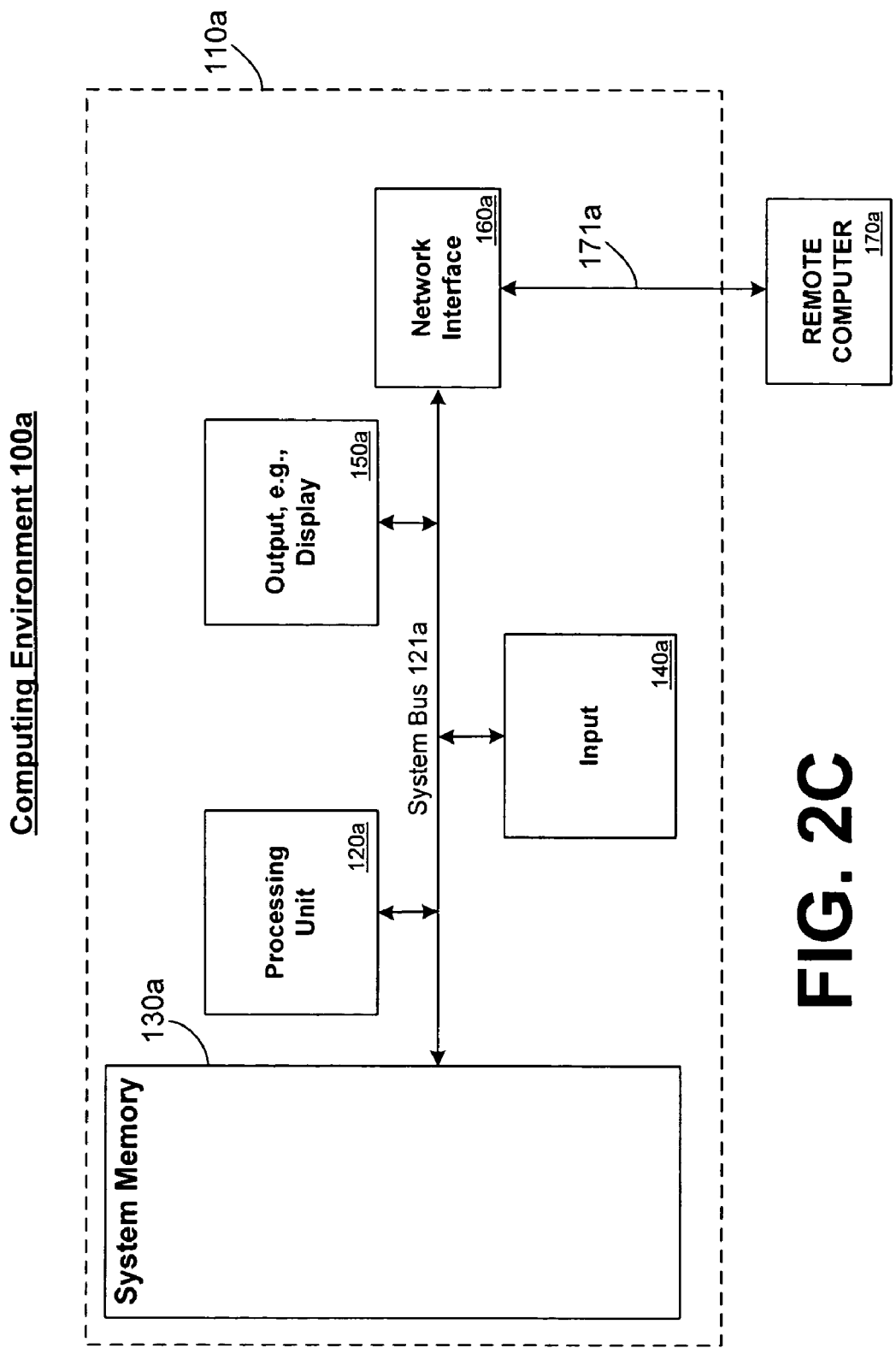
FIG. 2C is a block diagram representing a second exemplary non-limiting computing device, whether receiving or delivering data, in which the present invention may be implemented.

FIG. 2C and the following discussion are intended to provide a brief general description of a suitable computing environment for a device that may host or request access to content in connection with the use of the secure dynamic distribution of credentials of the invention. It should be understood, however, that handheld, portable and other computing devices and computing objects of all kinds are contemplated for use in connection with the present invention, i.e., anywhere that a device may wish to host or request the delivery of a media experience for the device. The differences in these devices in terms of media capabilities makes use of the invention of significant advantage—to tailor remote media experiences to different remote devices by understanding the credentials of the requesting computing device.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 2C thus illustrates an example of a suitable computing system environment 100a in which the invention may be implemented, although as made clear above, computing system environments 100 and 100a are only two examples of suitable computing environments for distribution of credentials in accordance with the invention and is not intended to suggest any limitation as to the scope of use or functionality of the invention. Neither should the computing environments 100 or 100a be interpreted as having any dependency or requirement relating to any one or combination of components illustrated in the exemplary operating environment 100 or 100a.

With reference to FIG. 2C, a second exemplary device for implementing the invention includes a general purpose computing device in the form of a computer 110a. Components of computer 10a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. As discussed above, computer readable media can be any available media that can be accessed by computer 110a. The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media, which may be connected to the system bus 121a through a non-removable memory interface such as an interface, and a magnetic disk drive or optical disk drive is typically connected to the system bus 121a by a removable memory interface, such as an interface.

A user may enter commands and information into the computer 110a through a variety of input devices. A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 2C include a network 171a, such local area network (LAN) or a wide area network (WAN), but may also include other networks/buses. Such networking environments are commonplace in homes, offices, enterprise-wide computer networks, intranets and the Internet.

Accordingly, the above-described general purpose computers are but examples, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the techniques in accordance with the invention.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods of the invention may be included in, supported in or accessed via all of the languages and services enabled by managed code, such as NET code, and in other distributed computing frameworks as well.

Dynamic and Secure Distribution of Credentials Prior to Automatic Logon

As mentioned, the invention provides systems and methods for distributing logon credentials to a requester device over a network automatically, by the host computer into which logging or access is sought before the login occurs to access content, a resource and/or a service of the host computer, e.g., begin a session between the requestor device and the host computer.

The invention thus allows for host machines to have control over client credentials in a secure way. Advantageously, hosts can rotate credentials on a frequent basis to improve security without requiring the client to participate in the rotation. Moreover, with the invention, clients need not hold credentials for any significant period of time, nor include security and storage mechanisms associated with doing so.

Figure 3A:
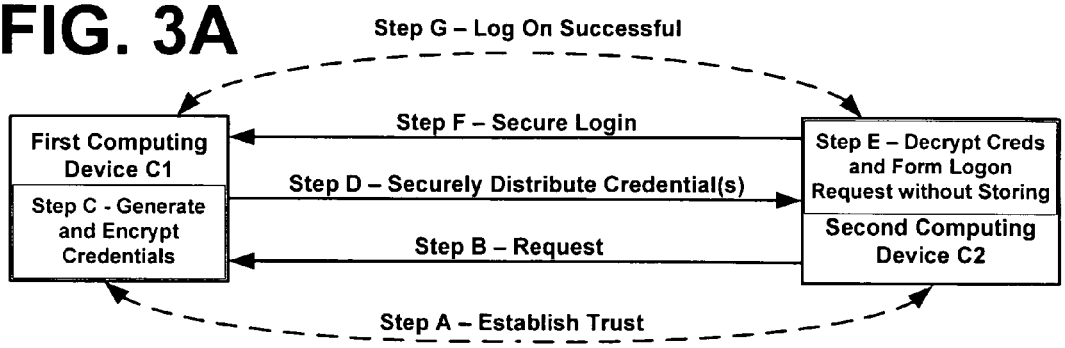
FIGS. 3A and 3B illustrate the dynamic secure distribution of credentials from a first computing device to a second computing device according to various embodiments of the systems and methods of the invention.

FIG. 3A illustrates exemplary embodiments of the invention and generally depicts the secure dynamic distribution of credentials just before logon in accordance with the invention. As illustrated at step A, a first device C1, such as a host device, trusts the communications from a second device, e.g., a client device, due to a prior exchange between the devices, i.e., trust has been established between the devices at step A. One exemplary way of establishing trust is to input biometric information associated with a user such that it is shared at both devices. Other exemplary ways of establishing trust include having a user enter a trust code into one of the devices which is received at the other device to establish a shared secret. Similarly, a user could insert or input the same hardware component, e.g., a memory stick or a USB memory device, into both devices to establish trust between the devices according to a validation process. Another exemplary way of establishing trust may include a "setup" process between the second device C2 and the first device C1, (i) which causes a public key owned by the second device C2 to be stored in the first device C1 and (ii) whereby the first device C1 ensures that the public key obtained from the second device C2 is truly from the second device C2 and not a "rogue" device which intends to intercept the logon credentials handed out by the first device C1. This trusted exchange of the public key can happen in many different ways known to those of ordinary skill in the art. For example, commonly assigned copending U.S. application Ser. No. 10/888,132 , filed Jul. 9, 2004, entitled "Trusted Network Transfer of Content Using Off Network Input Code" (the '132' Application) describes systems and methods for transferring content, such as a public key, from one computing device to a second computing device in a network using a simple user entered code, thereby establishing trusted communications between the devices. In various embodiments, the '132' Application teaches systems enabling trusted transmission and reception of content, such as encryption key information, from one computing device in a network to another, using a simple code entered out of band of the network content exchange.

Sometime after the first device C1 and the second device C2 have established trust, at step B, second device C2 makes a request for a resource of the first device C1 which implicates an authentication exchange. In accordance with the invention, since the first device C1 has a public key from the second device C2 that is trusted, as illustrated at step C, first device C1 automatically generates logon credentials and encrypts these credentials using that public key for secure distribution of the credentials on the network at Step D.

Having received the credentials, the second device C2 decrypts the credentials with the corresponding private key at step E, and, without storing the credentials, also at step E, a logon object automatically generates a logon request to the first device C1 wrapping the credentials, and re-encrypting as appropriate (e.g., via the shared public key) in accordance with the associated authentication protocol for logon requests. The logon request is transmitted to first device C1 from second device C2 at step F, without having been stored on second device C2. In one embodiment, for additional protection, the logon object takes advantage of protected memory space in connection with its operation. At step G, log on is successful, and private communications in accordance with the request at step B may begin between the first device C1 and second device C2 in accordance with established access levels and permissions.

It should be noted that in accordance with the invention, the encrypted credentials (along with any other information sent in connection with logon credentials) from the first device C1 may be stored unprotected on the first device C1, or freely distributed on the network since only second device C2 can decrypt them. Accordingly, thereafter, each time the second device C2 wants to logon to first device C1, second device C2 sends a network message indicating the desire to logon, the first device C1 then replies with the encrypted credentials. The second device C2 decrypts the credentials using its private key and then, immediately, uses those credentials to log back onto the first device C1. Advantageously, the credentials can be regenerated later by the first device C1 at any time and then re-encrypted with the public key from the second device C2. Thus, the next time the second device C2 attempts to login, the second device C2 dynamically obtains the new credentials and uses them for login.

Figure 3B:
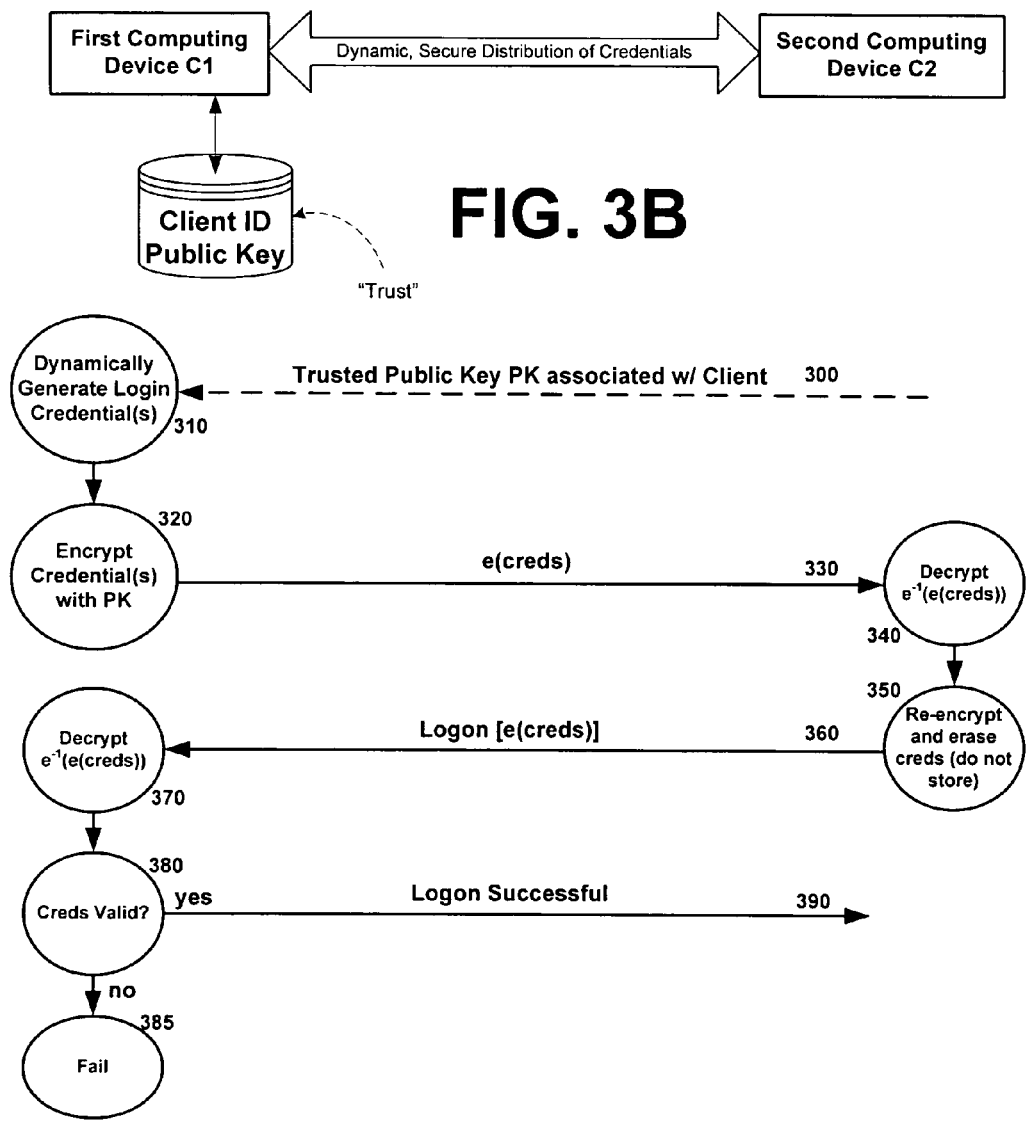

FIG. 3B illustrates an exemplary system in which communications between the first computing device C1 and the second computing device C2 implement the above-described process. At 300, first device C1 receives the public key from second device C2 in a manner that establishes the trustworthiness of second device C2, e.g., via the methods of the '132' application. At 310, sometime after the establishment of trust, in response to pre-defined event(s) (such as a request from second device C2), first device 310 dynamically generates logon credentials and encrypts the credentials with the public key of the second device C2 at 320. At 330, the encrypted credentials are sent on the network to the second device C2. The second device C2 decrypts the credentials at 340, and re-encrypts and erases the credentials at 350, while also issuing a logon request according to the appropriate logon protocol. The first device decrypts the credentials at 370 and processes the logon request at 380 by determining the validity of the credentials at 380. If the credentials are valid, the secure logon is successful at 390. If invalid, the flow fails at 385 because the logon is not successful.

Figure 4A:
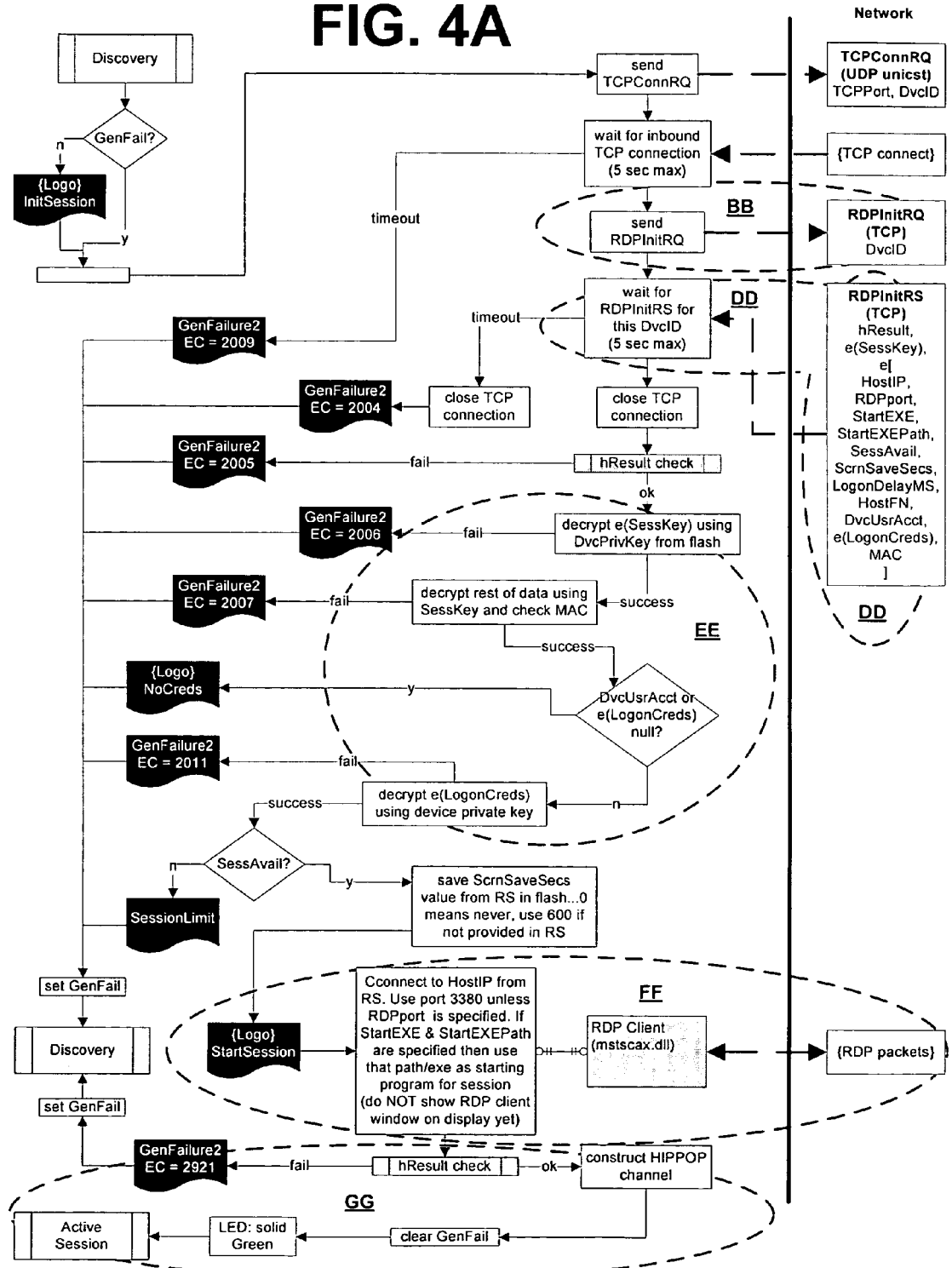
FIGS. 4A and 4B illustrate exemplary non-limiting flow diagrams representing processes performed and protocols that may be followed in connection with an embodiment of the secure dynamic credential distribution over a network in accordance with the invention wherein a client device wishes to start a session with a host device.
Figure 4B:
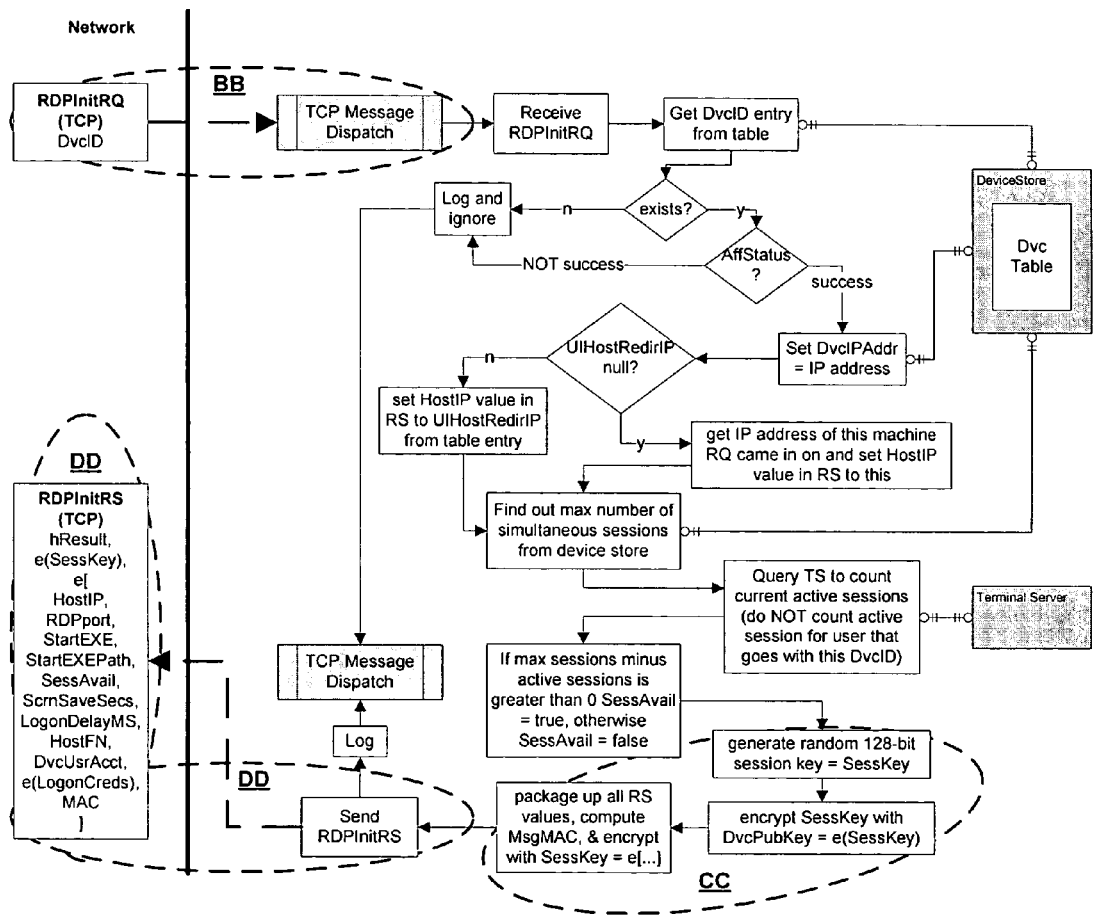

FIGS. 4A and 4B illustrate exemplary non-limiting flow diagrams representing processes performed and protocols that may be followed in connection with an embodiment of the secure dynamic credential distribution over a network in accordance with the invention wherein a client device wishes to start a session with a host device. Accordingly, if trust has been established between the host and the client, the invention may be applied to the scenario of establishing a session.

For brief definition, a session is the environment created in the operating system when a user account is logged into a machine using the credentials associated with that account. When a user logs in, a session is created; when the user logs out, the session is ended. Once logged in, a session exists for the user account until they are logged off either manually or forced by the OS. In one embodiment, for a scenario where a first device, trusted by a second device, wishes to logon to the second device with a set of credentials, the invention provides systems and methods for dynamically generating and securely distributing to the first device a set of credentials for use in beginning such a session, wherein the credentials are not stored or otherwise exposed on the requestor device.

Portions of FIGS. 4A and 4B are recognizable as non-limiting implementations of the block diagram of FIG. 3A by way of the dashed ovals and corresponding similar numbering (e.g., reference to step B of FIG. 3A becomes reference BB in FIGS. 4A-B, reference to step D of FIG. 3A becomes DD in FIGS. 4A-B, and so on). Thus, the request of step B corresponds to area BB where RDPInitRQ is called by the client (FIG. 4A) to start a session with the host (FIG. 4B). In FIG. 4B, step C corresponds to area CC showing communications and processes relating to the dynamic generation of logon credentials by the host device, and the corresponding use of the client's public key for encryption. Step D is generally shown in area DD where the logon request is transmitted from the host to the client (FIG. 4B) in a secure fashion due to the encryption of the client's public key, and received by the client (area DD of FIG. 4A). Just after receiving and decrypting the credentials as shown in area EE of FIG. 4A, in connection with establishing a session with the host device, the client automatically logs on to the host with the decrypted credentials via processes associated with area FF, and an active session begins when automatic logon with the credentials is successful, as shown generally by the processes of area GG.

However, it should be clear that FIGS. 4A and 4B merely illustrate one implementation of the exemplary communications that may occur between devices from a processing, interface and protocol standpoint, and it should be emphasized that the invention may be implemented with a variety of other processes, protocols, interfaces and the like. For instance, one can appreciate that many algorithms can assume an infinite number of mathematical shapes and forms, and that the key consideration from a software standpoint is whether the algorithms perform the desired function, in any explicit or implicit form. Moreover, data structures may also assume many forms, and thus, for instance, types, names, classes, etc. can be defined in a variety of ways. Table I below, for instance, illustrates some exemplary implementation choices for variables referred to in FIGS. 4A and 4B, but consistent with the present description, such implementation details are not intended to be limiting on the invention.

TABLE I

Exemplary Variables for use with Logon Credentials

| DvcPubKey | 256 byte int | NULL | Public key of the device |
| LogonKey | 128-bit symmetric key | NULL | Symmetric "session" key encrypted with the DvcPubKey; used to encrypt the LogonCreds |
| LogonCreds | Var length bit field | NULL | NT user account credentials encrypted with LogonKey for the DvcUsrAcct |

Thus, it should be clear that FIGS. 4A and 4B illustrate an exemplary, non-limiting, implementation of the invention, and that the invention should be defined with reference to the appended claims.

There are multiple ways of implementing the present invention, e.g., an appropriate API, tool kit, driver code, operating system, control, standalone or downloadable software object, etc. which enables applications and services to use the dynamic secure distribution of credentials according to the invention. The invention contemplates the use of the invention from the standpoint of an API (or other software object), as well as from a software or hardware object that generates, processes, receives or transmits credentials via the mechanism of the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to automatically and securely distribute credentials just previous to login. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples may be chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize credential distribution mechanism(s) of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer or distributed networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular protocols and communications, the invention is not so limited, but rather any protocol may be implemented to provide dynamic secure distribution of credentials in accordance with the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for automatically distributing logon credentials from a first device to a second device over a network, the method comprising:
   receiving a secret from the second device at the first device according to at least one trust mechanism that validates that the secret is authentically from the second device;
   receiving a request for access to at least one resource of the first device from the second device over the network;
   in response to said request, generating by the first device at least one logon credential for use in connection with logging onto the first device and sending the at least one logon credential to the second device over the network for use in automatically logging onto the first device, wherein the at least one logon credential is encrypted by the first device prior to being sent;
   decrypting the at least one credential at the second device;
   generating, at the second device, a logon request containing the at least one credential without storing the at least one credential;
   encrypting the logon request with the at least one credential at the second device and sending the encrypted logon request with the at least one credential to the first device;
   at the first device, decrypting the encrypted logon request with the at least one credential and determining the validity of the at least one credential contained in the encrypted logon request received from the second device; and
   accepting the logon request if the at least one credential contained in the logon request is determined to be valid.

2. A method according to claim 1, wherein said secret is a public key of the second device.

3. A method according to claim 1, further including performing said generating and said sending periodically to rotate said at least one logon credential.

4. A method according to claim 1, further including sending acknowledgment of a successful login to the second device.

5. A method according to claim 1, wherein said at least one trust mechanism is based on at least one of a biometric user input, a trust code and a hardware component.

6. A computing device comprising means for carrying out the method of claim 1.

7. A machine that generates its own logon credentials for distribution to a requestor over a network, the machine comprising:
   a secure dynamic logon credential component for handling requests for access to at least one resource of the machine from the requestor, wherein in response to a request for access to at least one resource of the machine, based on a secret received from the requestor according to at least one trust mechanism that validates that the secret is authentically from the requestor, said secure dynamic logon credential component generates at least one logon credential for use in connection with logging onto the machine, encrypts the at least one logon credential based on the secret, and sends the encrypted at least one logon credential to the requestor over the network; and
   a second component that receives from the requestor an encrypted logon request containing the at least one logon credential, decrypts the encrypted logon request, and accepts the logon request if the at least one logon credential contained in the logon request is valid.

8. A machine according to claim 7, wherein said secret is a public key of the requestor.

9. A machine according to claim 7, wherein said secure dynamic logon credential component generates, encrypts, and sends to the requestor a new at least one logon credential periodically to rotate said at least one logon credential.

10. A machine according to claim 7, wherein said second component sends acknowledgment of a successful login to the requestor.

11. A machine according to claim 7, wherein said at least one trust mechanism is based on at least one of a biometric user input, a trust code and a hardware component.

12. A method for automatically obtaining logon credentials from a first device by a second device for the purpose of logging onto the first device over a network, the method comprising:

transmitting a secret from the second device to the first device according to at least one trust mechanism that validates that the secret is authentically from the second device;

requesting access to at least one resource of the first device by the second device over the network;

in response to said requesting, receiving from the first device at least one logon credential for use in connection with logging onto the first device, wherein the at least one logon credential is encrypted by the first device using the secret before being received from the first device;

without storing the at least one logon credential on the second device, generating, by the second device, a logon request containing the at least one logon credential encrypting the logon request with the at least one logon credential; and sending the logon request from the second device to said first device.

13. A method according to claim 12, wherein said secret is a public key of the second device.

14. A method according to claim 12, further including receiving at least one new logon credential periodically to rotate said at least one logon credential.

15. A method according to claim 12, further comprising decrypting, by the second device, the at least one logon credential based on the secret.

16. A method according to claim 15, wherein the at least one logon credential is decrypted based on a private key corresponding uniquely to a public key.

17. A method according to claim 12, further including, in response to said sending, receiving acknowledgment of a successful login.

18. A method according to claim 12, wherein said at least one trust mechanism is based on at least one of a biometric user input, a trust code and a hardware component.

19. A computing device comprising means for carrying out the method of claim 12.

20. A client device that automatically obtains logon credentials from a host device for the purpose of logging onto the host device over a network, the client device comprising:

a first component that sends a public key of the client to the host device according to at least one trust mechanism that is based on at least one of a biometric user input, a trust code and a hardware component, the at least one trust mechanism validating that the public key is authentically from the client device;

a second component that requests access to at least one resource of the host device over the network; and a third component that receives from the host device, in response to requests by said second component, at least one encrypted logon credential for use in connection with logging onto the host device and decrypts the at least one encrypted logon credential, and, without storing the at least one decrypted logon credential on the client device, generates a logon request containing the at least one logon credential, encrypts the logon request with the at least one logon credential, and sends the encrypted logon request to said host device, wherein the third component receives an updated version of at least one logon credential periodically to rotate said at least one logon credential.

21. A client device according to claim 20, wherein said third component decrypts the at least one encrypted logon credential based on the public key.

22. A client device according to claim 21, wherein said third component decrypts the at least one encrypted logon credential based on a private key corresponding uniquely to the public key.

23. A client device according to claim 20, wherein said third component further receives acknowledgment of a successful login in response to said logon request.

24. A computer readable storage medium comprising computer executable instructions for automatically distributing logon credentials from a first device to a second device over a network, the computer executable instructions comprising instructions for:

in the first device, obtaining a secret from the second device according to at least one trust mechanism that validates that the secret is authentically from the second device;

receiving a request for access to at least one resource of the first device from the second device over the network;

generating by the first device at least one logon credential in response to the request being received from the second device wherein said at least one logon credential is for logging onto the first device;

in the first device, encrypting the at least one logon credential based on the secret;

sending the at least one logon credential to the second device over the network for use in automatically logging onto the first device;

receiving, in the first device from the second device, an encrypted logon request containing the at least one logon credential in the first device, decrypting the encrypted logon request with the at least one logon credential;

determining the validity of the at least one logon credential contained in the logon request; and accepting the logon request if the at least one credential contained in the logon request is determined valid.

25. A computer readable storage medium according to claim 24, wherein said secret is a public key of the second device.

26. A computer readable storage medium according to claim 24, further comprising computer executable instructions for performing said generating, said encrypting, and said sending periodically to rotate said at least one logon credential.

27. A computer readable storage medium according to claim 24, further comprising computer executable instructions for sending acknowledgement of a successful login to the second device.

28. A computer readable storage medium according to claim 24, wherein said at least one trust mechanism is based on at least one of a biometric user input, a trust code and a hardware component.

29. A computer readable storage medium comprising computer executable modules having computer executable instructions for automatically obtaining logon credentials from a first device by a second device for the purpose of logging onto the first device over a network, the modules comprising:

a first module for transmitting a secret from the second device to the first device according to at least one trust mechanism that validates that the secret is authentically from the second device;

a second module for requesting access to at least one resource of the first device over the network;

a third module is for receiving in the second device from the first device at least one logon credential for use in connection with logging onto the second device in response to a request for access made by said means for requesting, wherein the at least one logon credential is encrypted by the first device based on the secret before the at least one logon credential is received in the second device;

a fourth module for decrypting, in the second device, the encrypted at least one logon credential received from the first device; and a fifth module is for generating a logon request containing the at least one logon credential, encrypting the logon request, and sending the logon request to said first device without storing the at least one logon credential on the second device.

30. A computer readable storage medium according to claim 29, wherein said secret is a public key of the second device.

31. A computer readable storage medium according to claim 29, wherein said third module periodically receives at one new logon credential to rotate said at least one logon credential.

32. A computer readable storage medium according to claim 29, wherein said fourth module decrypts at least one logon credential based on the secret.

33. A computer readable storage medium according to claim 32, wherein said fourth module decrypts at least one logon credential based on a private key corresponding uniquely to a public key.

34. A computer readable storage medium according to claim 29, further including a sixth module for receiving acknowledgment of a successful login in response to the logon request.

35. A computer readable storage medium according to claim 29, wherein said at least one trust mechanism is based on at least one of a biometric user input, a trust code and a hardware component.

* * * * *